June 24, 1930. C. T. WEYMANN 1,767,825
METHOD OF ASSEMBLING VEHICLE BODIES
Filed Dec. 20, 1927 2 Sheets-Sheet 2
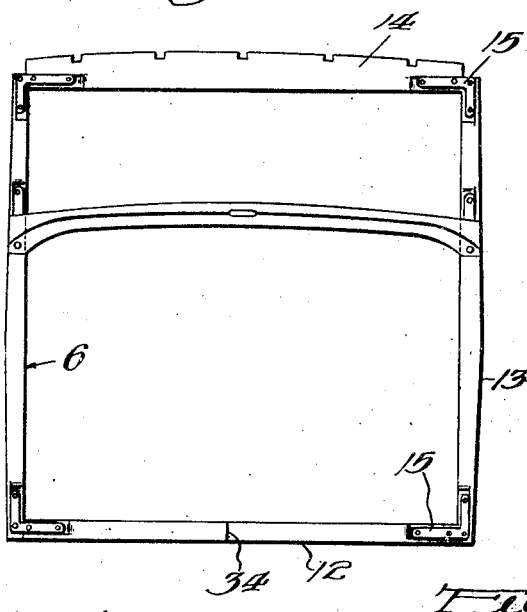
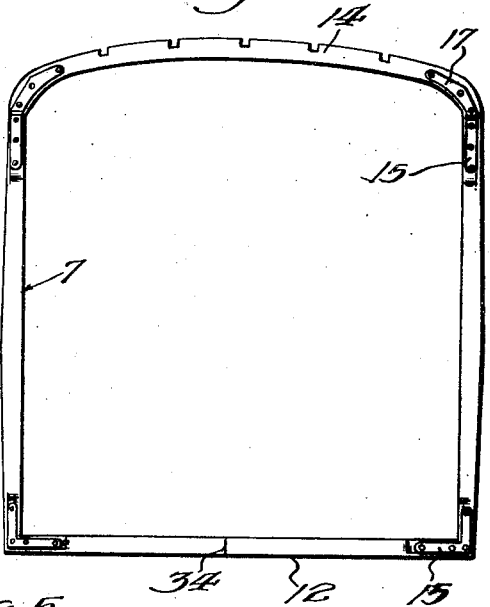
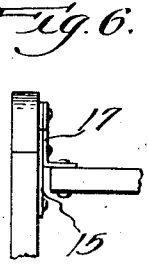
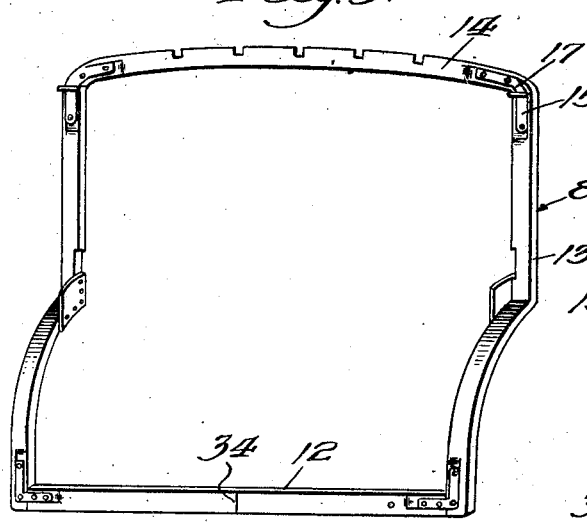
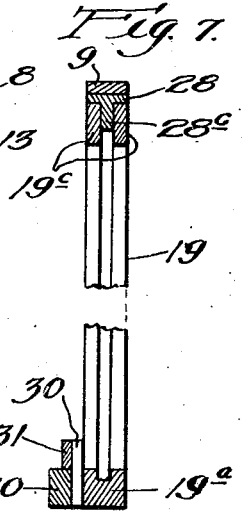
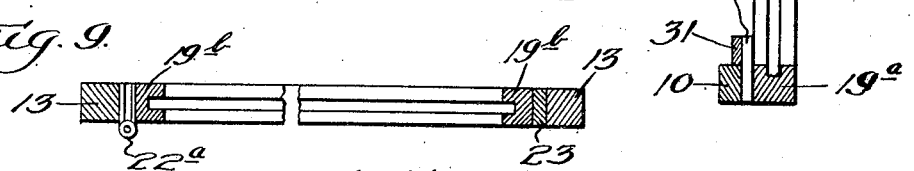
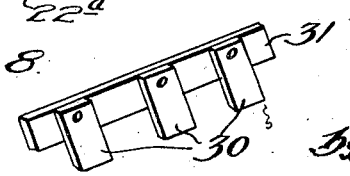
Inventor
Charles Terres Weymann Patented June 24, 1930

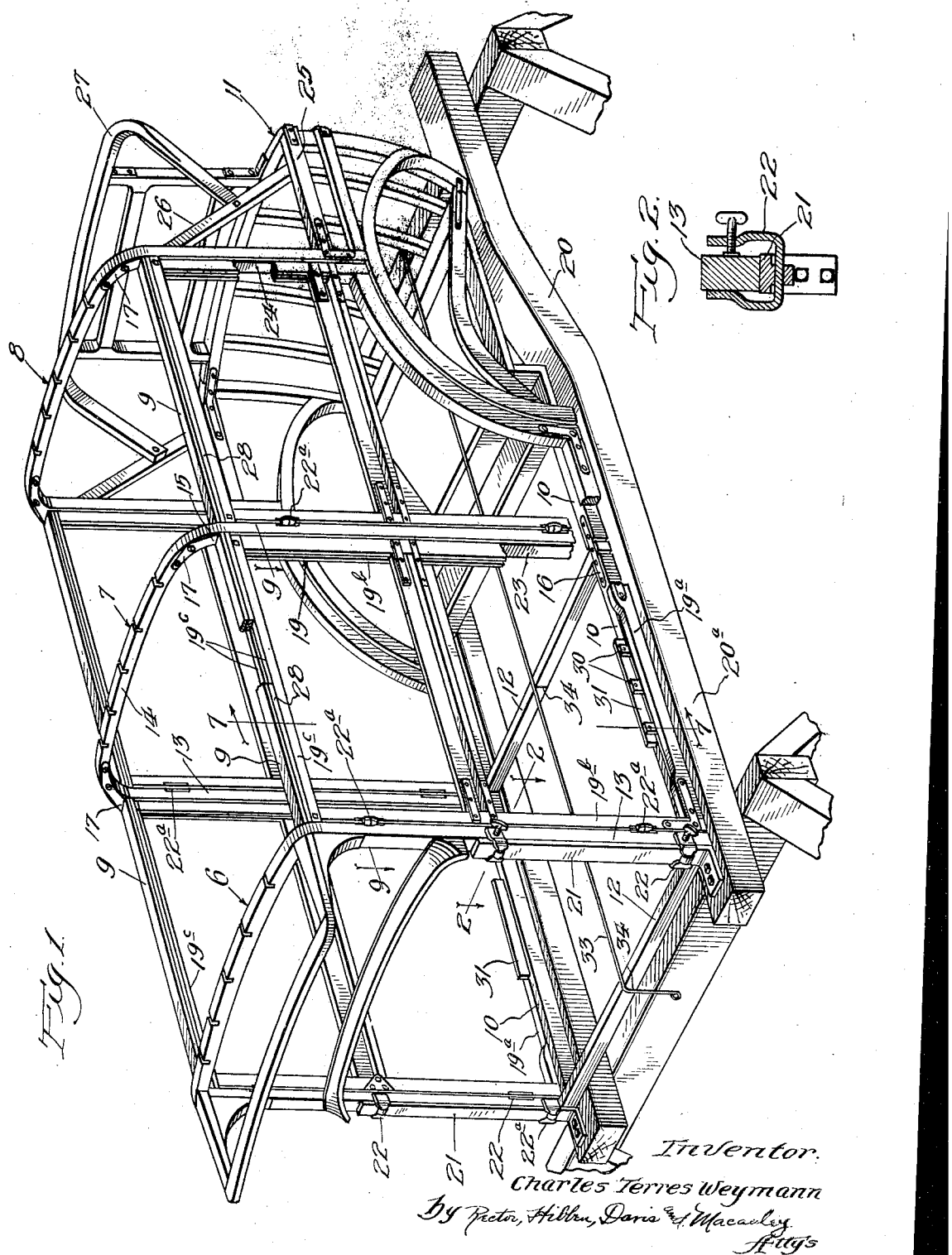

1,767,825

UNITED STATES PATENT OFFICE

CHARLES TERRES WEYMANN, OF PARIS, FRANCE, ASSIGNOR, BY MESNE ASSIGNMENTS, TO WEYMANN MOTOR BODIES, INC., OF WILMINGTON, DELAWARE, A CORPORATION OF DELAWARE

METHOD OF ASSEMBLING VEHICLE BODIES

Application filed December 20, 1927. Serial No. 241,418.

This invention relates to a novel method of assembling bodies for automobiles and the like.

In constructing bodies now generally in use in the United States, the body is usually built up piece by piece which are separately carefully formed and fitted as the assembly of the body progresses, a form being used by the body builder to serve as a pattern in giving the body the desired contour and assure the requisite accuracy of alignment of the parts. The production of these standard bodies in any considerable number necessitates a large factory and the use of a large number of cumbersome and expensive forms and tools. The initial cost of equipping the factory for production is very large, the floor space required is excessive, a large force of highly skilled body makers must be maintained, and the assembly of each body is a long and expensive job.

The principal object of my invention is to provide a method of assembling bodies which will require minimum floor space, very little equipment, and a comparatively small force of workmen who are not necessarily highly skilled, and which will greatly reduce the time and work required for assembling and finishing the body. The parts may be made at a factory and shipped to the automobile manufacturers or to body assembling plants to be there easily and quickly assembled.

In the well-known Weymann type of body, which I invented, the skeleton frame comprises a plurality of transverse vertical frames, and longitudinal connecting members between the tops and bottoms of the posts of the frames, the skeleton being covered with a fabric-like material such as leather, imitation leather or the like. The skeleton frame is preferably of a flexible nature so that it is adapted to weave or flex in harmony with, rather than rigidly resist, the distortions or warping action of the chassis-frame, due to uneven road conditions. While I have shown and described my present invention as applied to this Weymann type of body, for the sake of convenience, it will be understood that other types of bodies may be assembled by my method and the use of my apparatus.

In assembling the body, as shown and described herein, I provide a simple frame, which might be termed a "horse" for convenience of expression. The front transverse vertical frame of the body is mounted in fixed vertical position on the horse, the door frames are then mounted on the posts of this frame, and the second transverse frame is placed in position with a spacing strip between its posts and the rear edges of the door frames. The longitudinal connecting members are then secured in position between the two frames being properly spaced from the door by spacing devices. If the body has four doors, the rear door frames are then mounted in position and the third transverse vertical frame from the front is set on the horse with spacing strips between the door frames and the posts of this frame. The longitudinal connecting members between the second and third frame are then secured to the frames and finally the rear or tonneau structure is mounted in position on the horse and connected to the rest of the body frame. It will thus be seen that I dispense with the expensive, cumbersome and space-occupying forms, now generally used, and merely employ a simple horse and spacing strips and devices in assembling the body. The pieces making up the skeleton frame do not need to be cut with such great exactness, proper hanging of the doors and alignment of the parts are assured, less skilled labor is required, and the body may be assembled in the minimum space of time.

The attainment of the above objects, and others will become apparent from the following descriptions when taken in connection with the accompanying drawings in which—

Figure 1 is a perspective view of a body skeleton frame, illustrating the apparatus used in and method of assembling the body;

Fig. 2 is a detail top plan view of a suitable form of clamp for securing the front transverse vertical frame unit in position on the horse;

Figs. 3 and 4 are front elevations of the front and second transverse vertical frame units, respectively, of the body shown in Fig. 1;

Fig. 5 is a perspective view of the transverse vertical frame immediately to the rear of the rear doors;

Fig. 6 is a fragmentary side view illustrating a form of bracket for connecting the vertical transverse frame units to the upper longitudinal connecting members;

Fig. 7 is a vertical section taken through one side of the body frame and a door frame as on the line 7—7 of Fig. 1;

Fig. 8 is a perspective view of one of the spacers and

Fig. 9 is a horizontal section taken through one of the door frames and the adjacent body posts, as on the line 9—9 of Fig. 1.

Referring to Figs. 1 to 4, inclusive, it will be seen that the skeleton frame of the body generally comprises vertical transverse units (the front, intermediate, and third units being designated generally by the reference numerals 6, 7 and 8, respectively), connected together by top longitudinal members 9 and corresponding bottom members 10, and a rear end or tonneau structure designated generally by the reference number 11. I have shown in Fig. 1, a body of the brougham style but it will be understood that the invention is applicable to any style of body. If the body to be assembled is of the sedan style, for example, a rear transverse vertical frame extending to the top of the body would be employed and it would be connected to the transverse vertical frame 8 by suitable longitudinal spacing pieces.

As stated above, I have shown a body of the Weymann flexible type, though it will be understood that the use of my invention is not limited to that type of body. Each of the transverse vertical frames 6, 7 and 8, comprises a bottom cross bar 12, vertical posts 13 and a top cross bow 14, the parts being connected together by the well known Weymann joints 15.

The ends of the bottom longitudinal members 10, which connect the lower ends of the transverse vertical frames together, are connected to the end portions of the cross bars 12 by means of the Weymann joints 16, (Fig. 1) each comprising a flat strip of metal bolted or nailed or otherwise fastened to the upper edges of the members 10 and one of the cross bars 12. The top longitudinal connecting members 9 may be connected at their ends to the transverse frame units 6, 7 and 8 by means of brackets 17 (Figs. 4 and 5), which are superimposed on the upper parts of the brackets 15. The frames 19 of the doors are also flexible. The bottom piece 19ᵃ of each door is connected to the vertical pieces 19ᵇ by Weymann joints. The upper ends of the pieces 19ᵇ are connected together by two thin pieces 19ᶜ (Figs. 1 and 7) which are spaced apart to accommodate a sliding window (not shown) in the door.

The parts of the skeleton frames for the desired number of bodies are first cut to the desired lengths and the holes for the rivets or bolts of the joints are drilled, the distances between the bolt holes in each piece being accurately measured. In building a body, the transverse frames and door frames are first assembled into separate units. The tonneau section may also be assembled as a separate unit.

In assembling the units together to form the finished skeleton frame, I dispense entirely with the usual forms and jigs and employ a simple horse 20 which may comprise two suitable supported members 20ᵃ having vertical front posts 21, in exact right-angular relation to the members 20ᵃ. The posts 13 of the front transverse frame 6 are placed against the posts 20 and the frame is held in place by means of the clamp screws 22 (Fig. 2), which may be of any desired construction. The front door frames are then mounted by means of hinges 22ᵃ (Figs. 1 and 9), to the vertical posts 13 of the front transverse frame. The hinges are so formed as to permit a narrow space to exist between the posts 13 and the front edges of the door frame. Thin spacing strips 23 are tacked lightly to the rear edges of the door frames. The second frame 7 is next placed in upright position against the spacing strips 23. Spacing strips 28 (Fig. 7) are placed on top of the door frames, the strips 28 having depending tongues 28ᶜ projecting between the pieces 19ᶜ forming the tops of the door frames. The connecting members are laid on top of the strips 28 and then connected to the frames 6 and 7. The lower members 10 are then secured to the bottom bars 12 of the frames 6 and 7, the members 10 being suitably spaced from the bottom members 19ᵃ of the door frames by spacing tongues 30 (Figs. 7 and 8) secured to bars 31 resting on the members 10. The rear door frames are now mounted on the vertical posts of the frame 7. Spacing strips 24 are tacked to the rear edges of the rear doors. The transverse frame 8 is next set against the spacing strips 24 and the longitudinal members 9 and 10, between the second and third transverse frames, are then fastened to these frames. These members 9 and 10 also being spaced from the rear door frames by the spacing strips 28 and tongues 30. After the spacing strips have served their purpose they are removed.

In order to easily center the transverse vertical frames on the horse to secure accurate alignment of the frames, a wire 33 is extended horizontally down the middle of the horse and over the cross bars 12 of the frames and a center line or mark 34 is provided on the cross bar 12 of each frame. The rear or tonneau section is finally placed on the horse and is secured to the rear transverse frame 8 by Weymann joints. The top horizontal frame or unit 25 of the tonneau section, shown in Fig. 1, is connected to the vertical posts of the frame 8 by means of diagonal members 26, which support the rear top bow 27.

The spacing strips 23 and 24 may be tacked to the edges of the door frames either before or after the door frames are mounted in position, or the strips may be tacked to the posts of the second and third frames 7 and 8. Also, if the door frames are swung from hinges at their rear edges, the spacing strips are tacked to the front edges of the door frames or to the posts of the front and second frames 6 and 7.

After the skeleton is assembled, the outside edges of the vertical posts 13 and the adjacent outside edges of the vertical members of the door frames may be sanded by a sand-paper machine or planed by a planing machine to bring these edges into the same plane, in case one sticks out further than the other.

In the event that the back of the body is square, as in the sedan type of body, the rear end portion of the body would be changed as a back transverse vertical frame, extending to the top, would be employed and it would be connected to the third transverse frame 8 by means of spacing bars.

After the body frame is assembled, as above described, the body frame and door frames are covered by flexible coverings, such as leather, imitation leather, or other fabric-like material. The spaces around the edges of the doors accommodate the ends of these coverings.

From the foregoing description, it will be seen that I have invented an extremely simple and inexpensive method of assembling vehicle bodies. Only the minimum amount of equipment and minimum space are required, forms are dispensed with, cheap labor may be employed and yet accuracy of alignment and the desired contour are attainable.

It will be evident that my invention is susceptible of various modifications, such as changes in the sequence of the steps of the method and in the construction of the horse and spacing devices, all coming within the scope of my invention. I have explained the application of my invention in connection with the assembling of a brougham style of body of the Weymann type, but it will be apparent that it is susceptible of use in connection with bodies of various styles and types.

I claim:

1. The method of assembling, without the use of jigs or forms, vehicle body skeletons comprising a plurality of transverse vertical frame units, longitudinal connecting members between said units, and door frames, which consists in securing one of the end transverse vertical frame units in fixed vertical position, positioning the door frames with respect thereto, placing the next transverse vertical frame in vertical position with respect to the door frames with spacing strips between the door frames and at least one of the transverse vertical frames, and flexibly connecting together the transverse vertical frames, as spaced apart by said door frames and spacing strips, by said connecting members, and thereafter removing said spacing strip whereby to form a skeleton capable of weaving and flexing.

2. The method of assembling, without the use of jigs or forms, vehicle body skeletons comprising transverse vertical frame units, door frames and longitudinal connecting members between the frames, which consists in securing one of the vertical transverse frames in vertical position on a temporary support, positioning the door frames with respect to the posts of such frame, positioning another transverse vertical frame on the support and on the other side of the door frames, providing spacing means between the posts of at least one of said transverse vertical frames and the door frames, and flexibly connecting together said transverse vertical frames, as spaced apart by said door frames and spacing means, by said connecting members, and thereafter removing the spacing means whereby to form a skeleton capable of weaving and flexing.

3. The method of assembling, without the use of jigs or forms, vehicle body skeletons comprising transverse vertical frames, door frames, and longitudinal connecting members between said transverse vertical frames, which consists in securing one of the transverse vertical frames in vertical position on a platform, mounting the door frames with respect to the posts of said frame, positioning a second transverse vertical frame on the platform at the other edges of the door frames, each door frame being hinged at one edge to a post of one of the transverse vertical frames and the posts of the other transverse frame being spaced from the other edges of the door frames by spacing means, and then flexibly connecting together the transverse vertical frames, as spaced apart by said door frames and spacing means, by said connecting members and thereafter removing said spacing means whereby to form a skeleton capable of weaving and flexing.

4. The method of assembling, without the use of jigs or forms, vehicle body skeletons comprising transverse vertical frame units, longitudinal connecting members and door frames which consists in securing one of the transverse frames temporarily on a support, positioning the door frames with respect thereto, positioning another transverse vertical frame with respect to the door frames with spacing strips between the door frames and one of said frames positioning the connecting members with spacers between the door frames and said members and flexibly connecting said members to said transverse vertical frames and thereafter removing said spacing strips whereby to form a skeleton capable of weaving and flexing.

5. The method of assembling, without the use of jigs or forms, vehicle body skeletons comprising transverse vertical frame units, longitudinal connecting members flexibly connected to the vertical frame units and door frames, which consists in securing one of the end transverse vertical frame units in fixed vertical position, positioning the door frames with respect thereto, placing the next transverse vertical frame in vertical position with respect to the door frames with spacing strips between the door frames and at least one of the transverse vertical frames, and finishing the outside surfaces of the vertical pieces of the door frames and adjacent posts of the transverse vertical frames together after the skeleton has been assembled and thereafter removing said spacing strips whereby to form a skeleton capable of weaving and flexing.

6. The method of assembling, without the use of jigs or forms vehicle body skeletons of the Weymann type, comprising transverse vertical frames, longitudinal members for connecting said frames, and door frames, which consists in first forming the transverse vertical frame units by connecting the pieces of each together by flexible joints, then securing one of the transverse vertical frames in vertical position on a platform, then positioning the door frames with relation thereto, positioning another transverse vertical frame at the other side of the door frames, placing a spacing strip between at least one edge of each door and the adjacent post of the adjacent transverse vertical frame, and flexibly connecting together the transverse vertical frames as spaced apart by said door frames and spacing strips, by said connecting members and thereafter removing said spacing strips whereby to form a skeleton capable of weaving and flexing.

7. The method of assembling, without the use of jigs or forms, vehicle body skeletons comprising transverse vertical frames, longitudinal connecting members, door frames, and a tonneau structure, which consists in securing the front vertical transverse frame in a certain vertical position on a temporary platform, positioning the door frames with relation thereto, then temporarily positioning on the platform another transverse frame in relation to the door frames, spacing pieces being provided between the door frames and the posts of at least one of the transverse vertical frames, then flexibly connecting together the transverse vertical frames, as spaced apart by said door frames and spacing pieces, by said connecting members, and last securing the tonneau structure to one of the transverse vertical frames and thereafter removing said spacing pieces whereby to form a skeleton capable of weaving and flexing.

8. The method of assembling, without the use of jigs or forms vehicle body skeletons comprising transverse vertical frames, door frames, and longitudinal connecting members, which consists in mounting the front transverse vertical frame on the platform, securing it in vertical position with a centering mark thereon in alignment with a center line on the platform, next positioning the door frames and the next transverse vertical frame with its centering mark in alignment with the center line on the said platform with spacing means between at least one edge of each door frame and the adjacent vertical post of the adjacent transverse vertical frame, then flexibly connecting the transverse vertical frames together by said connecting members and thereafter removing said spacing means whereby to form a skeleton capable of weaving and flexing.

9. The method of assembling, without the use of jigs or forms, vehicle body skeletons comprising transverse vertical frame units, longitudinal connecting members and door frames, which consists in securing one of the end transverse vertical frame units in a certain vertical position, positioning the door frames with respect thereto, placing the next transverse vertical frame in vertical position with respect to the door frames with spacing strips between the door frames and at least one of the transverse vertical frames, and flexibly connecting together the transverse vertical frames, as spaced apart by said door frames and spacing strips, by said connecting members and thereafter removing said spacing strips whereby to form a skeleton capable of weaving and flexing.

10. The method of assembling vehicle body skeletons comprising transverse vertical frames, door frames, and longitudinal connecting members between said transverse vertical frames, which consists in securing one of the transverse vertical frames in vertical position on a platform, mounting the door frames with respect to the posts of said frame, positioning a second transverse vertical frame on the platform at the other edges of the door frames, each door frame being hinged at one edge to a post of one of the transverse vertical frames and the posts of the other transverse frame being spaced from the other edges of the door frames by spacing means, and then flexibly connecting together the transverse vertical frames, as spaced apart by said door frames and spacing means, by said connecting members and thereafter removing said spacing means whereby to form a skeleton capable of weaving and flexing.

In testimony whereof I have subscribed my name.

CHARLES TERRES WEYMANN.